United States Patent [19]
Dyer

[11] Patent Number: 6,003,896
[45] Date of Patent: *Dec. 21, 1999

[54] AIRBAG CUSHION HAVING IRREGULAR CONFIGURATION

[75] Inventor: David J. Dyer, Kaysville, Utah

[73] Assignee: Autoliv ASP, Inc., Ogden, Utah

[ * ] Notice: Under 35 U.S.C. 154(b), the term of this patent shall be extended for 151 days.

[21] Appl. No.: 08/616,605

[22] Filed: Mar. 15, 1996

[51] Int. Cl.⁶ .................................................. B60R 21/16
[52] U.S. Cl. ................................. 280/743.1; 280/730.1; 280/730.2; 280/732
[58] Field of Search ............................... 280/728.1, 732, 280/743.1, 730.1, 730.2

[56] References Cited

U.S. PATENT DOCUMENTS 5,335,884  8/1994  Kalberer et al. ..................... 280/730.1
5,470,103  11/1995  Vaillancourt et al. ............... 280/730.1
5,486,019  1/1996  Chevroulet et al. ................. 280/743.1

FOREIGN PATENT DOCUMENTS 4-278859   10/1992  Japan ................................. 280/728.1
6-239191   8/1994   Japan ................................. 280/743.1
WO93/16902 9/1993   WIPO ................................ 280/730.1

*Primary Examiner*—Eric Culbreth
*Attorney, Agent, or Firm*—Sally J. Brown

[57] ABSTRACT

An inflatable cushion for a vehicle occupant restraint system includes a bag formed of flexible material and defining an internal cavity, and inflatable to a predetermined three-dimensional configuration. The bag is constructed of a plurality of panels of a durable, flexible material which are joined together to define a predetermined three-dimensional configuration such that at least a part of the bag will overlie an A pillar of a vehicle when the bag is in an inflated condition.

7 Claims, 2 Drawing Sheets

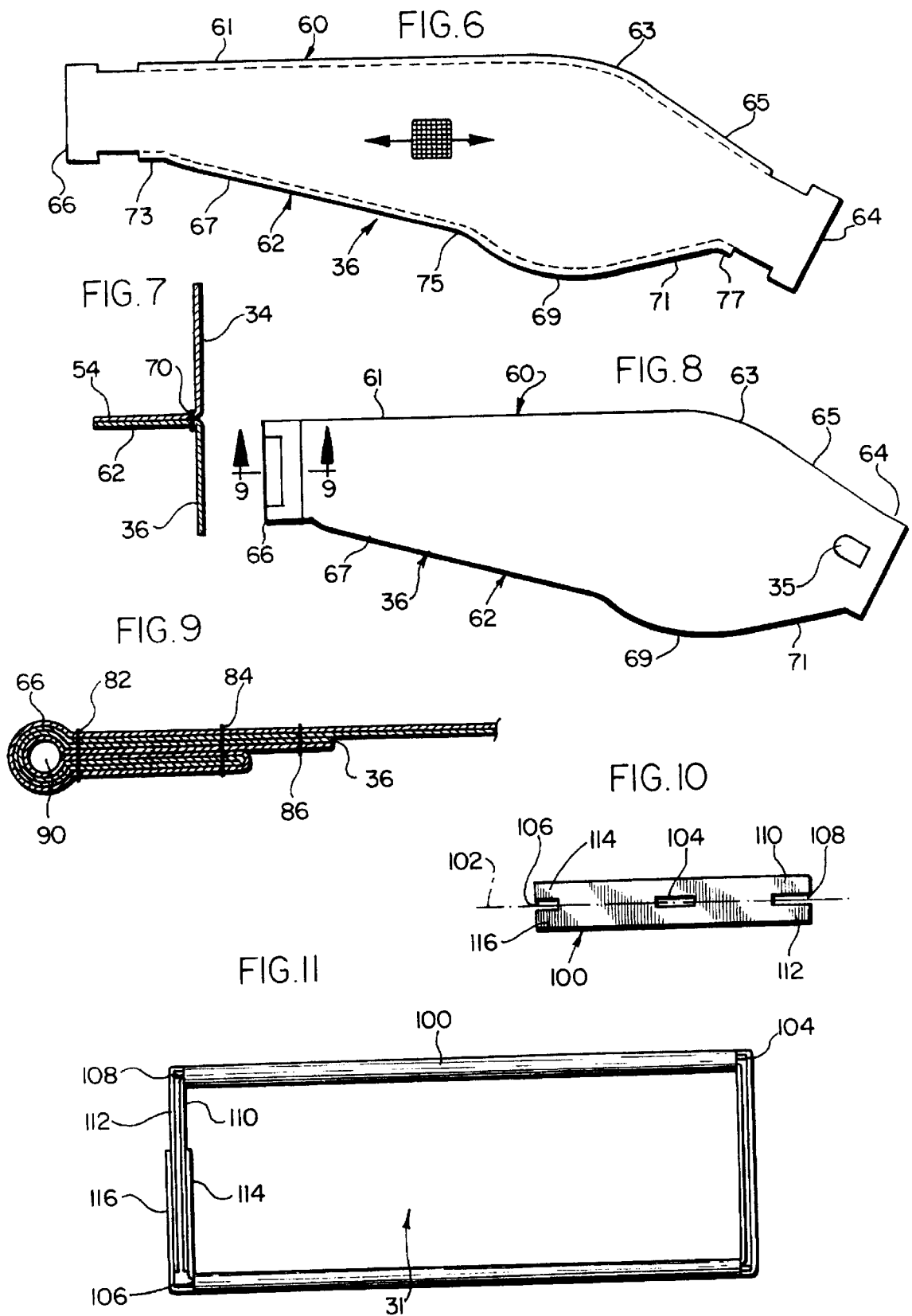

AIRBAG CUSHION HAVING IRREGULAR CONFIGURATION

BACKGROUND OF THE INVENTION

The present invention relates generally to inflatable passive restraint systems for use in automotive vehicles, and more particularly to an improved passenger side inflatable cushion or airbag having an irregular shape for overlying, when inflated, an A pillar of a vehicle.

Automotive vehicle passive restraint systems are now widely employed in vehicles for restraining the movement of a seated occupant during a collision. The majority of these occupant restraint systems now incorporate inflatable bags or cushions (commonly referred to as "airbags"). In such airbag systems, one or more inflatable bags or cushions are stored in a folded condition in storage areas within the passenger compartment of the vehicle. Upon actuation, such as upon a collision of the vehicle, the airbags or cushions are rapidly inflated and deployed into the vehicle passenger compartment.

This rapid inflation is effected by filling or inflating the airbags or cushions using gases generated by, or release from, an inflator unit. Such inflator units may use one of several systems for rapidly generating a quantity of gas for filling or inflating the bag or cushion. The inflated bag or cushion thus acts as a protective barrier between the passenger and interior vehicle surfaces, in effect cushioning any impact of the occupant and dispersing the force of the occupant's movement in the event of collision.

In most cases, the driver side airbag or cushion is stored in the vehicle steering wheel, while the passenger side bag or cushion is stored within the vehicle dashboard immediately in front of the front passenger seating area. Both of these airbags are designed to have their maximum effect in the event of a forward impact upon the vehicle.

In the event of an angular impact upon the vehicle, particularly from the passenger side, the passenger may be better protected from impact with the A pillar of the automobile by a cushion which when inflated is somewhat irregular in shape so as to provide additional cushioning between the passenger and the A pillar. It is an object of this invention to provide such an inflatable bag or cushion.

OBJECTS AND SUMMARY OF THE INVENTION

It is a general object of the invention to provide a novel and improved airbag for use in a passive vehicle occupant restraint system.

A related object is to provide such an airbag which is shaped so as to offer additional cushioning between the occupant and an A pillar of the vehicle when deployed.

Briefly, and in accordance with the foregoing objects, an inflatable cushion for a vehicle occupant restraint system comprises a bag formed of flexible material and defining an internal cavity; said bag being inflatable to a predetermined three-dimensional configuration; said bag comprising a plurality of panels of a durable, flexible material and means respectively joining said plurality of panels to define said predetermined three-dimensional configuration such that at least a part of said bag will overlie an A pillar of a vehicle when said bag is in an inflated condition.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

FIG. 6 is a plan view of a center panel thereof;

FIG. 7 is an enlarged, partial sectional view taken generally along the line 7—7 of FIG. 3;

FIG. 8 is a plan view, similar to FIG. 6, showing folding and stitching of opposite end portions of the center panel;

FIG. 9 is an enlarged, partial sectional view taken generally along the line 9—9 of FIG. 8;

FIG. 10 is a plan view of a reinforcing panel of the airbag of the invention; and FIG. 11 is an enlarged, partial view taken generally along the line of FIG. 3.

DETAILED DESCRIPTION OF THE ILLUSTRATED EMBODIMENT

Figure 1:
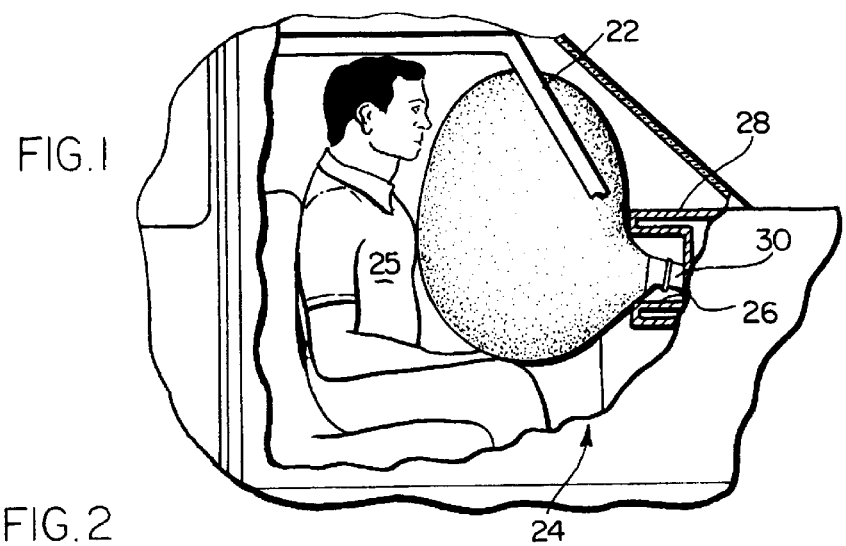
FIG. 1 is a partial side elevation, partially broken away, of an automotive vehicle provided with a passenger side airbag in accordance with the invention.
Figure 2:
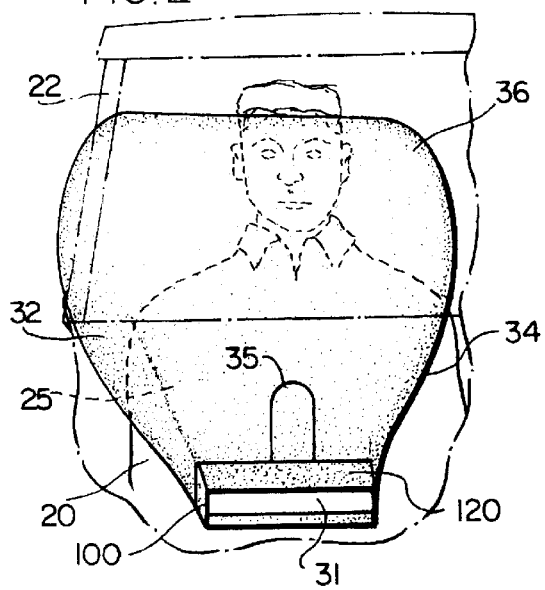
FIG. 2 is an elevation of an airbag in accordance with the invention, as viewed from the front of the vehicle and facing a seated passenger.
Figure 3:
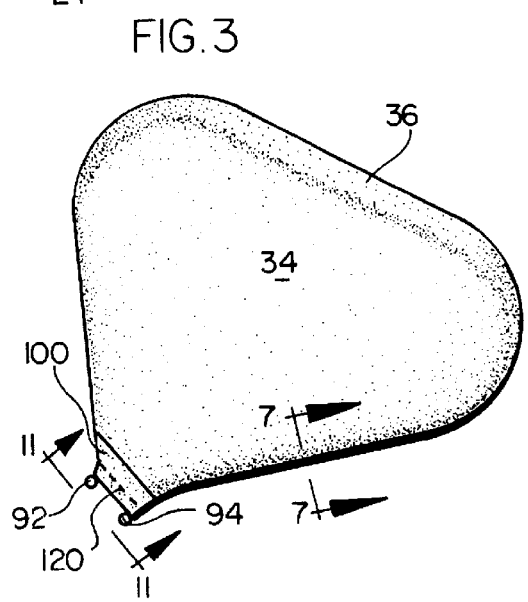
FIG. 3 is a side elevation of the airbag of FIGS. 1 and 2, taken generally from the side opposite that shown in FIG. 1.

Referring now to the drawings and initially to FIG. 1, an inflatable cushion for a vehicle occupant restraint system in accordance with the invention is illustrated in an inflated condition and designated by the reference numeral 20. The inflatable cushion 20 generally comprises a bag formed of flexible material defining an internal cavity and inflatable to a predetermined three-dimensional configuration as shown in FIGS. 1 through 3. This three-dimensional configuration is such that, when the bag is inflated, it will overlie an A pillar 22 of a vehicle 24 in which it is deployed. That is, the bag 20 will, when inflated, lie between and cushion an occupant 25 against contact with internal parts of the vehicle, including the A pillar 22. The inflatable cushion or air bag 20 is preferably normally carried in a folded condition within a compartment 26 provided in a dashboard 28 of the vehicle. A suitable inflator module 30 (partially shown in FIG. 1) may be operatively coupled with an inlet 31 (see FIG. 2) of the bag 20 in order to inflate the same under conditions of vehicle impact or the like when it is determined that the bag should be deployed or inflated, as illustrated in FIG. 1.

Figure 4:
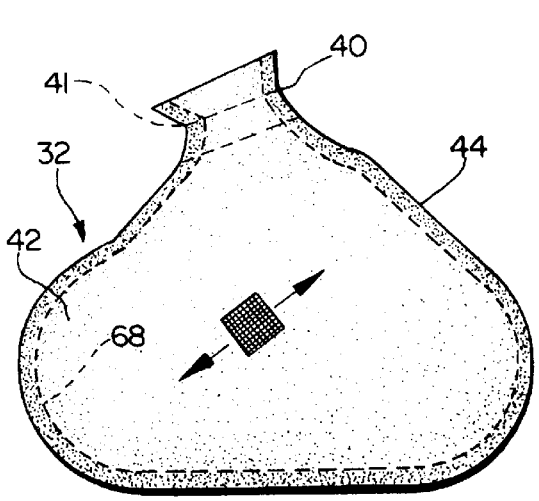
FIG. 4 is an elevation of an inboard panel of the airbag of FIGS. 1 through 3.
Figure 5:
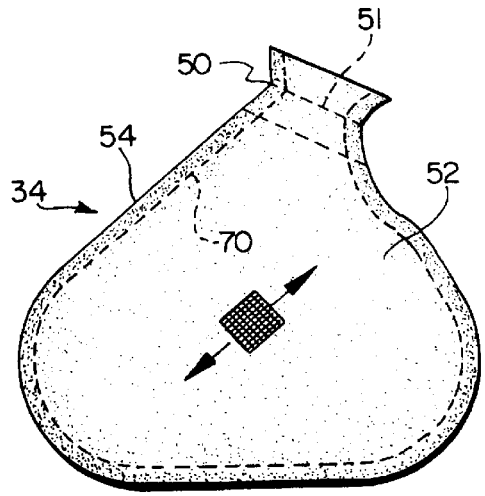
FIG. 5 is an elevation of an outboard panel thereof.

Referring also to FIGS. 2 and 3, it will be seen that the cushion or bag 20 is formed from a plurality of panels of a durable, flexible material, and means such as stitches join these panels together to define the assembled bag 20. Referring also to FIGS. 4, 5 and 6, the panels forming the bag 20 include an outer or outboard panel 32, an inner or inboard panel 34 and a center panel 36, which is joined along its respective edges with the outer panel 32 to one side and with the inner panel 34 to the other side to define and form the inflatable cushion or bag 20. A label 35 is shown to help orient FIG. 8 relative to FIG. 2.

The outer side panel 32 will be seen to have a restricted neck portion 40 and an enlarged body portion 42 which projects from the neck portion 40. This neck portion 40 and the enlarged wall portion 42 are defined by an outer peripheral edge 44 of the panel 32. Similarly, the inner panel 34 has a restricted neck portion 50 and an enlarged body portion 52 which extends or projects from the neck portion 50. Both of these portions are likewise defined by a continuous peripheral edge 54 of the side panel 34. The neck portion 50 of the side panel 34 is of substantially similar configuration and dimensions to the neck panel 40 of the outer side panel 32. However, the enlarged body portion 42 of the outer side panel 32 is of greater cross-sectional dimensions than the enlarged body portion 52 of the inner side panel 34.

As best viewed in FIGS. 4 and 5, it will be seen that the enlarged wall portions of 42, 52 of side panels 32 and 34 are generally triangular in configuration, having rounded corners at their edge portions remote from the areas in which the edges diverge to define the respective neck portions 40 and 50. Moreover, these necks 40, 50 are flared out from fold lines 41, 51. Prior to assembly these flared out portions are folded over at fold lines 41, 51, and therefore they mirror the portions of edges 44, 54 which they overlie.

As shown in FIG. 6, the center panel 36 has a first or outboard edge portion 60 which is complementary in its overall length to the peripheral edge 44 of the outer side panel 32. Similarly, the center panel 36 has a second or inboard edge portion 62 which is of generally the same or complementary length to the peripheral edge 54 of the inner side panel 34. These inboard and outboard edges 60, 62 terminate at respective opposite ends thereof in a top end portion 64 and a bottom end portion 66 which are formable, as will be more fully described later herein, to complementary configuration with the respective neck portions 40, 50 of the side panels after the same have been folded over, as described above, to form the inlet portion 31 of the assembled bag as best viewed in FIGS. 2 and 3. This inlet portion 31 is of a suitable configuration to be joined with an outlet portion of the inflator 30 for providing a quantity of gas for inflating the airbag 20 to the configuration shown in FIGS. 1–3 under proper circumstances, as mentioned above.

As best viewed in FIG. 6, the center panel configuration or shape may further be described by reference to its edges 60 and 62. The outboard edge 60 has a first portion 61 which generally defines a straight line of a first length and extends from the bottom end part 66. A second portion 63 extends from the first portion 61 and defines a curve of fixed radius which curves generally in the direction of the outboard edge 62. Finally, a third portion 65 extends from the second curved portion 63 and defines a straight line of a second length which is much shorter than the length of the first portion 61.

Similarly, and referring to the inboard edge 62 of the center panel 36, a first portion 67 defines a straight line which extends from the bottom end portion 66, which is shorter than and diverges away from the first edge portion 61 of outboard edge 60. A second inboard edge portion 69 is curved about a fixed radius and generally curves back in the direction of the outboard edge 60. A third portion 71 of inboard edge 62 defines a relatively short straight line which extends from the second portion 69 in a direction that is convergent with the direction in which the third portion 65 of outboard edge 60 extends. The third edge portions 65 and 71 terminate at opposite sides of the top end portion 64 of the center panel 36. Preferably, the curved edge portion 63 has a somewhat greater radius of curvature and is somewhat shorter than the curved edge portion 69.

In addition to the foregoing details, in the illustrated embodiment, the inboard edge 62 includes a relatively short straight portion 73 which extends a short distance from bottom end 66 generally parallel with outboard edge portion 61. The first edge portion 67 extends from this short edge portion 73 at an angle so as to diverge from outboard edge portion 61 as described above. Also, a relatively short reversely curved section 75 interconnects respective straight section 62 and curved portion 69. Finally, a relatively short straight edge portion 77 extends at an angle from edge portion 71 so as to be generally parallel with outboard edge portion 65 and terminate at the top end 64 of the center panel 36.

FIGS. 4, 5 and 6 also illustrate means for joining the center panel with the respective side panels to define the assembled airbag 20. In the illustrated embodiment, these joining means comprise a first plurality of stitches 68 joining the center panel outboard edge 60 to the peripheral edge 44 of the outer side panel 32 and a second plurality of stitches 70 joining the inboard edge 62 of the center panel 36 with the peripheral edge 54 of the inner side panel 34.

Referring to FIG. 7, a preferred arrangement of folding over respective edge portions of the center panel 36 and the inner side panel 34 and the stitching 70 thereof is illustrated in further detail. It will be understood that the same type of folding and stitching is preferably also used with respect to the outboard edge 60 of the center panel where it joins the peripheral edge 44 of the outer side panel 32. In a preferred embodiment of the invention, the stitches 68 and 70 comprise a double needle chain stitch having a stitch count of 35±5 per 100 mm. As shown in FIG. 7, in the preferred embodiment the folded portion or overlap of the respective edges is approximately 25 mm. Other specific types of stitches and amounts of overlap of the fabric might be utilized without departing from the invention, the foregoing being for purposes of giving a specific example only.

For purposes of describing a preferred embodiment, it is further noted that the fabric of which the respective panels is formed is designated as 630d 41×41 low perm style #935504. Moreover, the weave of the fabric is preferably oriented on the respective panels as partially illustrated in FIGS. 4, 5 and 6, with the double arrows indicating the warp direction.

Referring now to FIGS. 8 and 9, a folding over and stitching of the respective top and bottom end portions 64 and 66 of the center panel in order to join with the neck portions 40, 50 of the side panels 32, 34 to define the inlet 31, is illustrated. Referring to FIG. 9, respective stitches 82, 84 and 86 joining together and define these folded end portions which are formed from the top and bottom ends 64 and 66 of the center panel 36. In the preferred embodiment, the stitches 82 and 86 are singled needle lock stitches, while the stitch 84 is a doubled needle lock stitch. In each case, the stitch count is preferably 35±5 stitches per 100 mm. This end formation defines an open-ended generally cylindrical pocket or through opening 90 which may receive one of two solid nylon rods 92, 94 (see FIG. 3) which define further rigidity at the respective ends, and also provide reinforced surfaces for attachment to the inflator 30.

Referring now to FIGS. 10 and 11, an additional reinforcing panel 100 is folded over about a center line thereof indicated at reference numeral 102, and then folded into a generally rectangular configuration and attached about the open end of the assembled bag to reinforce the inlet 31 as indicated in FIG. 11. The reinforcing panel 100 has a center cut-out portion 104 and respective end cut-out portions 106, 108 which align with the lateral sides of the inlet as viewed in FIG. 11. Thus, the end opening 106 defines two tabs or flaps 114, 116 while the end slot 108 defines tabs or flaps 110, 112 which overlap the flaps 110, 112. Preferably, the panel 100 is attached to the respective panels 32, 34 and 36 by a stitch 120 as indicated in FIGS. 2 and 3. Preferably, this stitch 120 comprises a double needle lock stitch of a 35±5 stitch counts per 100 mm.

While particular embodiments of the invention have been shown and described in detail, it will be obvious to those skilled in the art that changes and modifications of the present invention, in its various aspects, may be made without departing from the invention in its broader aspect, some of which changes and modifications being matters of routine engineering or design, and others being apparent only after study. As such, the scope of the invention should not be limited by the particular embodiments and specific constructions described herein but should be defined by the appended claims and equivalents thereof. Accordingly, the aim in the appended claims is to cover all such changes and modifications as fall within the true spirit and scope of the invention.

The invention is claimed as follows:

1. An inflatable cushion for a vehicle passenger restraint system comprising: a bag formed of flexible material and defining an internal cavity; said bag being inflatable to a predetermined three-dimensional configuration; said bag comprising a plurality of panels of a durable, flexible material and means respectively joining said plurality of panels to define said predetermined three-dimensional configuration when said bag is in an inflated condition; wherein said plurality of panels comprise an inner side panel having a peripheral edge defining a restricted neck portion and an enlarged wall portion projecting from said neck portion, an outer side panel having a peripheral edge defining a neck portion of substantially similar dimensions to the neck portion of said inner side panel and an enlarged wall portion projecting from said neck portion and of greater cross-sectional dimensions than the enlarged wall portion of said inner side panel, and a center panel having an inboard edge complementary to said peripheral edge of said inner side panel about said enlarged wall portion, an outboard edge complementary to a peripheral edge of said outer panel about said enlarged wall portion thereof, and respective top and bottom portions formable to complementary configuration with the neck portions of the inner and outer side panels.

2. An inflatable cushion according to claim 1 wherein said joining means comprises a first plurality of stitches respectively joining said center panel inboard edge to the peripheral edge of said inner side panel and a second plurality of stitches joining said center panel outboard edge with the peripheral edge of said outer side panel.

3. An inflatable cushion according to claim 1 and further including a neck reinforcement panel engaging the respective top and bottom end portions of said center panel and said neck portions of said inner and outer side panels and a plurality of stitches respectively joining said reinforcing panel with said center panel top and bottom end portions and said neck portions of said inner and outer side panels.

4. An inflatable cushion according to claim 1 wherein the enlarged wall portion of each of said inner and outer side panels is generally triangular in configuration, having rounded corners at edge portions thereof remote from areas at which said edges diverge from said neck portion.

5. An inflatable cushion according to claim 4 wherein said center panel inboard edge has a first portion extending from the bottom end portion defining a straight line of a first length, a second portion extending from said first portion which curves in the direction of said outboard edge, and a third portion extending from said second portion which defines a straight line of a second length much shorter than said first length, and wherein said center panel outboard edge has a first portion extending from the bottom end portion which diverges from said first portion of said inboard edge, a second portion extending from said first portion which curves in the direction of said inboard edge, and a third portion extending from said second portion which is convergent with the third portion of said inboard edge at the top end portion of said center panel.

6. An inflatable cushion according to claim 1 wherein said center panel inboard edge has a first portion extending from the bottom end portion defining a straight line of a first length, a second portion extending from said first portion which curves in the direction of said outboard edge and a third portion extending from said second portion which defines a straight line of a second length much shorter than said first length, and wherein said center panel outboard edge has a first portion extending from the bottom end portion which diverges from said first portion of said inboard edge, a second portion extending from said first portion which curves in the direction of said inboard edge, and a third portion extending from said second portion which is convergent with the third portion of said inboard edge at the top end portion of said center panel.

7. An inflatable cushion according to claim 6 wherein the first portion of the outboard edge is shorter in length than the first portion of the inboard edge, and the second portions are of similar curvature and length.

\* \* \* \* \*